(12) United States Patent
Nishihara (10) Patent No.: US 8,516,685 B2
(45) Date of Patent: Aug. 27, 2013

(54) METHOD OF MANUFACTURING A DISK DRIVE DEVICE FOR REDUCING ADHESIVE AMOUNT OF PARTICLES

(75) Inventor: Kenji Nishihara, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 652 days.

(21) Appl. No.: 12/687,103

(22) Filed: Jan. 13, 2010

(65) Prior Publication Data
US 2010/0254043 A1    Oct. 7, 2010

(30) Foreign Application Priority Data

Apr. 7, 2009 (JP) ................. 2009-092997

(51) Int. Cl.
*G11B 5/41* (2006.01)
*G11B 5/48* (2006.01)
*B08B 3/12* (2006.01)

(52) U.S. Cl.
USPC ........... 29/603.03; 29/603.04; 134/1; 134/26; 134/32; 134/34; 134/36

(58) Field of Classification Search
USPC .............. 29/630.03, 603.04, 603.07; 134/1, 134/26, 29, 32–34, 36, 902
See application file for complete search history.

(56) References Cited

U.S. PATENT DOCUMENTS

| | | | |
|---|---|---|---|
| 6,231,676 B1 * | 5/2001 | Rudd et al. ........................ | 134/1 |
| 6,248,180 B1 * | 6/2001 | Sato et al. .................. | 134/32 X |
| 6,397,470 B1 * | 6/2002 | Saichi et al. ........... | 29/603.03 X |
| 6,588,597 B2 | 7/2003 | Arakane et al. | |
| 6,843,257 B2 * | 1/2005 | Yeo et al. ..................... | 134/32 X |
| 6,863,740 B2 * | 3/2005 | Moriyama et al. ............ | 134/1 X |
| 7,114,239 B2 * | 10/2006 | Hirooka ................. | 29/603.07 X |
| 7,246,440 B2 | 7/2007 | Obara et al. | |

FOREIGN PATENT DOCUMENTS

| | | |
|---|---|---|
| JP | 59150584 A | 8/1984 |
| JP | 02028786 U | 2/1990 |
| JP | 7-124529 | 5/1995 |
| JP | 08318181 A | 12/1996 |
| JP | 11033476 A | 2/1999 |
| JP | 2000254605 A | 9/2000 |
| JP | 2005213498 A * | 8/2005 |
| JP | 2006334482 A | 12/2006 |

OTHER PUBLICATIONS

JPO, Office Action in counterpart Japanese Patent Application No. 2009-092997 dated Jun. 28, 2013.

* cited by examiner

*Primary Examiner* — A. Dexter Tugbang
(74) *Attorney, Agent, or Firm* — Fulwider Patton LLP (57) ABSTRACT

In a method of manufacturing a disk drive device, a cleaning process and an assembly process are performed in succession in a clean room having a predetermined cleanness level. The cleaning process includes an alkali cleaning process, a first purified water cleaning process, a second purified water cleaning process, a spray cleaning process, a draining process and a drying process. In the first purified water cleaning process, purified water ultrasonic wave cleaning is sequentially performed on the base member of the disk drive device to be cleaned by using ultrasonic waves of frequencies of 40 kHz, 68 kHz and 132 kHz in purified water filled in a first purified water cleaning tank. The cleaned base member and other components having a predetermined cleanness level are assembled in the assembly process continuous from the cleaning process.

11 Claims, 5 Drawing Sheets

METHOD OF MANUFACTURING A DISK DRIVE DEVICE FOR REDUCING ADHESIVE AMOUNT OF PARTICLES

CROSS-REFERENCE TO RELATED APPLICATION

This application is based upon and claims the benefit of priority from the prior Japanese Patent Application No. 2009-092997, filed on Apr. 7, 2009, the entire content of which is incorporated herein by reference.

BACKGROUND OF THE INVENTION

1. Field of the Invention

The present invention relates to a method of manufacturing a disk drive device and a disk drive device manufactured by the method, and in particular, to a method of manufacturing a disk drive device for reducing the adhesive amount of particles and a disk drive device manufactured by the method.

2. Description of the Related Art

Recently, the rotational accuracy of disk drive devices, such as HDDs and the like, has been dramatically improved by providing them with a fluid dynamic bearing unit. With this improvement, a disk drive device has been required to have a higher density and a more increased capacity. For example, a disk drive device magnetically storing data rotates a recording disk with recording tracks at high speed so that a read/write operation of data is executed while the flying magnetic head of the device is tracing the recording tracks with a slight flying height between both of them. In order to make such a disk drive device have a high density and an increased capacity, the width of the recording track is required to be narrow. As the width thereof becomes more narrow, the space between the magnetic head and the recording disk is required to be further narrowed. For example, the flying height between both is required to be extremely narrow, as narrow as 10 nm or less.

For the purpose of obtaining high density, magneto-resistance effect devices (hereinafter, referred to as MR devices) are in heavy use for the magnetic heads. On the other hand, because an MR device is used in an extremely-narrow flying height, the occurrence of thermal asperity failure (hereinafter, referred to as "TA failure") or head crash failure can become a serious problem. TA failure is caused due to momentary heat generation in the MR device, the heat generation triggered by kinetic energy generated by the contact of the MR device with a minute foreign substance on the surface of the disk while the flying magnetic head traces the recording tracks. When the MR device is momentarily heated followed by being cooled, the resistance value of the MR device momentarily varies such that a reproduced signal is superimposed with a noise, causing the accuracy of reading the reproduced signal to be deteriorated. After intensive investigation, the present inventors have learned that TA failure is caused by foreign substances, which adhere to a disk drive device by being adhered to the surface of a recording disk through vibration, air flow, etc., having a size of approximately 0.1 μm to several μm (hereinafter, collectively referred to as "particles").

The disk drive device is composed of an assembly, which includes: a base member; a bearing unit consisting of a sleeve, and a shaft relatively rotatable with respect to the sleeve; and a hub member rotatably supported, on the base member, by the bearing unit. The disk drive device is manufactured by mounting a recording disk on the hub member and by including a magnetic head, a drive device for the magnetic head, a control circuit, and other necessary parts.

Conventionally, machine parts of which a disk drive device is composed are assembled together after being treated with a cleaning process where foreign substances on the part such as dust are removed by cleaning with, for example, ultrasonic waves in a cleaning tank filled with a predetermined cleaning liquid. In the cleaning process, a so-called batch cleaning has been the mainstream, in which the parts to be cleaned are dipped into the cleaning liquid in a state where, for example, units of several hundreds of the parts to be cleaned are stacked together in a cleaning basket. Such a cleaning process is heavily used for cases where small parts are manufactured on a large scale. In the batch cleaning, the cleaning baskets and the parts to be cleaned are dried after cleaning and stored at a storage site such as a warehouse, as disclosed in Japanese Patent Application Publication No. Hei 7-124529. Thereafter, in an assembly process, the stored parts that have been cleaned are taken out and fed to an assembly line where the disk drive device is assembled.

In a manufacturing method using the aforementioned batch cleaning, the level of the cleanness as a whole by the cleaning process is generally low. For example, the cleanness level of a disk drive device is evaluated by the number of particles having a size greater than or equal to 0.5 μm per 1 cm2 (hereinafter, referred to as the "LPC"). The LPC is obtained in the following procedures: a device to be tested is dipped into a tank filled with, for example, 2000 cc of purified water; an ultrasonic wave of a frequency of 68 kHz and a power of 98 W are radiated onto the device to be tested for 120 seconds; and the number of particles existing in the purified water is counted with, for instance, a liquid particle counter such as CLS-700 or LS 200 (made by Particle Measuring Systems, Inc., U.S.A).

In the conventional batch cleaning, there has been a large variation in the cleanness levels of the parts to be cleaned between those that are placed in the outer area of the cleaning basket and those in the inner area thereof. Also, particles once detached from a part to be cleaned may likely to adhere to another part. Further, when intending to obtain a desired cleanness level, the cleaning takes a long time, causing the working efficiency to be deteriorated. Further, particles floating in air may sometimes adhere to a part that has been cleaned while it is being stored in the warehouse after the cleaning. As stated above, if many particles remain on the parts, TA failure is more likely to occur when the flying height of the magnetic head is small, becoming an obstacle for obtaining a higher density and an increased capacity of the disk drive device. Accordingly, it can be thought that a process of wiping the particles off with, for example, a solvent such as hexane, could be added before or after the assembly work; however, the addition of the process causes a decrease in the manufacturing efficiency, and, in many cases, the particles cannot be removed thoroughly with the wiping process.

SUMMARY OF THE INVENTION

Accordingly, the present invention has been made to solve the aforementioned problems, and a purpose of the invention is to provide a technique in which the cleanness level of a component of a disk drive device can be improved and in which the possibility of the occurrence of a TA failure can be maintained at a low level even when the flying height of a magnetic head is small.

In order to solve the aforementioned problems, a method of manufacturing a disk drive device according to an embodiment of the present invention includes at least: a base member; a bearing unit configured such that a shaft and a sleeve housing the shaft are relatively rotatable with respect to the base member; and a hub supported by the bearing unit, in which at least one component of the disk drive device is cleaned while being transported, in a cleaning process where a purified water cleaning using ultrasonic waves of at least two frequencies is performed in purified water, and in which components of the disk drive device including the one component thus cleaned are assembled in an assembly process, continuous from the cleaning process, in a clean area having a predetermined cleanness level or a greater level of cleanness.

According to the embodiment, the component is subjected to an ultrasonic wave cleaning while in purified water, using ultrasonic waves of at least two frequencies. The ultrasonic waves to be used are selected from the frequencies of, for example, approximately 40 KHz to 200 KHz. In this case, a relatively low frequency is used as a first ultrasonic wave frequency. When a frequency is low, the wavelength is long and strong cavitation can occur, allowing for large mass particles to be removed efficiently. A relatively high frequency is used as a second frequency thereof. When a frequency is high, the wavelength is short, allowing for particles remaining in narrow spaces to be removed efficiently by the short wavelength. That is, large particles having a large mass, and small particles having a small mass and remaining in narrow spaces can be removed efficiently by performing the ultrasonic wave cleaning using ultrasonic waves of at least two (high and low) frequencies, allowing the cleanness level of the whole component to be enhanced. Further, the assembly work is carried out in the assembly process, continuous from the cleaning process, in a clean area having a predetermined cleanness level or a greater level of cleanness without moving the component to another area after the cleaning, and hence the assembly of the disk drive device can be completed in a state where the attachment of particles is suppressed. As a result, the probability of the occurrence of a TA failure can be reduced even when the flying height of the magnetic heads is small.

Another embodiment of the present invention also relates to a method of manufacturing a disk drive device. The method is a method of manufacturing a disk drive device that is configured to include at least: a base member; a bearing unit configured such that a shaft and a sleeve housing the shaft are relatively rotatable with respect to the base member; and a hub supported by the bearing unit, in which at least one component of the disk drive device is cleaned while being transported, in a cleaning process where a purified water cleaning using an ultrasonic wave is performed in purified water, and subsequently a blow cleaning, blowing a mixture of purified water and air, is performed, and in which components of the disk drive device including the one component thus cleaned are assembled in an assembly process, continuous from the cleaning process, in a clean area having a predetermined cleanness level or a greater level of cleanness.

Blowing the mixture of purified water and air against the component to be cleaned provides a great amount of kinetic energy for removing particles. Accordingly, large mass particles remaining on the component, which cannot be removed only by the purified water cleaning, can be removed, allowing the cleanness level of the whole component to be enhanced. Further, the assembly work is performed in the assembly process in the clean area having a predetermined cleanness level or a greater level of cleanness without moving the component to another area after the cleaning, and hence the assembly of the disk drive device can be completed in a state where the reattachment of particles is suppressed. As a result, the probability of the occurrence of a TA failure can be reduced even when the flying height of the magnetic heads is small.

Yet another embodiment of the present invention relates to a disk drive device. The device is manufactured by either of the aforementioned methods of manufacturing a disk drive device.

According to the embodiment, the assembly of a disk drive device can be performed with components whose cleanness levels are enhanced by the cleaning process. As a result, the probability of the occurrence of a TA failure can be reduced even when the flying height of the magnetic heads is small.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
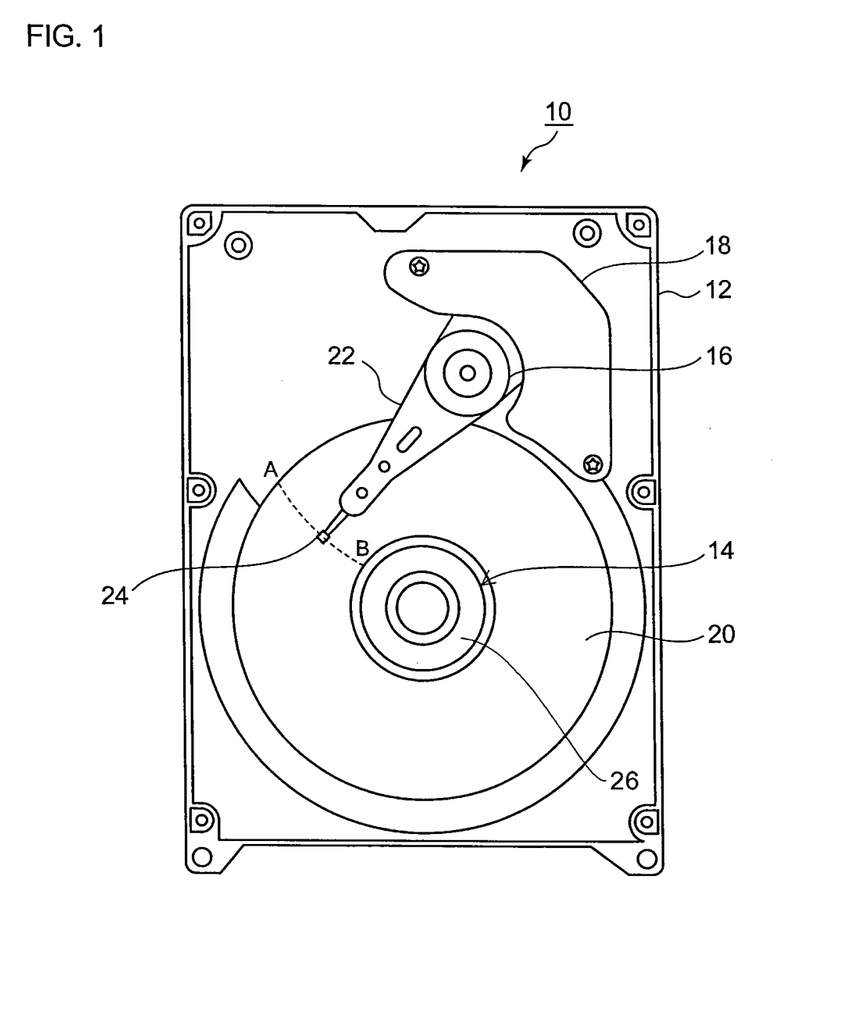
FIG. 1 is a view illustrating the internal structure of a hard disk drive device, an example of a disk drive device assembled by using components manufactured by a manufacturing method according to the present embodiment.

Hereafter, preferred embodiments of the present invention will be described based on the accompanying drawings. FIG. 1 is a view illustrating the internal structure of a hard disk drive (HDD) 10, an example of a disk drive device assembled by using components manufactured by a manufacturing method according to the present embodiment (hereinafter, simply referred to as a "disk drive device 10"). It is noted that FIG. 1 illustrates a state where the cover of the device is removed to expose the internal structure.

A brushless motor 14, an arm bearing unit 16, a voice coil motor 18, etc., are mounted on the top surface of a base member 12. The brushless motor 14 supports, on the rotation axis thereof, a hub member 26 on which a recording disk 20 is mounted, allowing the recording disk 20 on which data can be recorded, for example, magnetically, to be rotationally driven. The brushless motor 14 can be replaced by, for example, a spindle motor. The brushless motor 14 rotationally drives the recording disk 20. The brushless motor 14 is driven by a three-phase drive current consisting of a U-phase, a V-phase and a W-phase. The arm bearing unit 16 supports, in a swing-free manner, a swing arm 22 within a movable range AB. The voice coil motor 18 makes the swing arm 22 swing in accordance with external control data. A magnetic head 24 is fixed to the tip of the swing arm 22. When the disk drive device 10 is in an operation state, the magnetic head 24 moves, with a swing of the swing arm 22 within the movable range AB, above the surface of the recording disk 20 with a slight gap between them, allowing the read/write of the data to be performed. In FIG. 1, point A corresponds to the position of the outermost circumferential recording track of the recording disk 20, and point B corresponds to the position of the innermost circumferential recording track thereof. The swing arm 22 may be moved to a waiting position provided in the side of the recording disk 20 when the disk drive device 10 is in a stopped state.

In the present embodiment, a structure, which includes all of the components for reading/writing data such as the recording disk 20, the swing arm 22, the magnetic head 24 and the voice coil motor 18, is sometimes expressed as a disk drive device, or sometimes as an HDD. Or, only the components for rotationally driving the recording disk 20 are sometimes expressed as a disk drive device.

Figure 2:
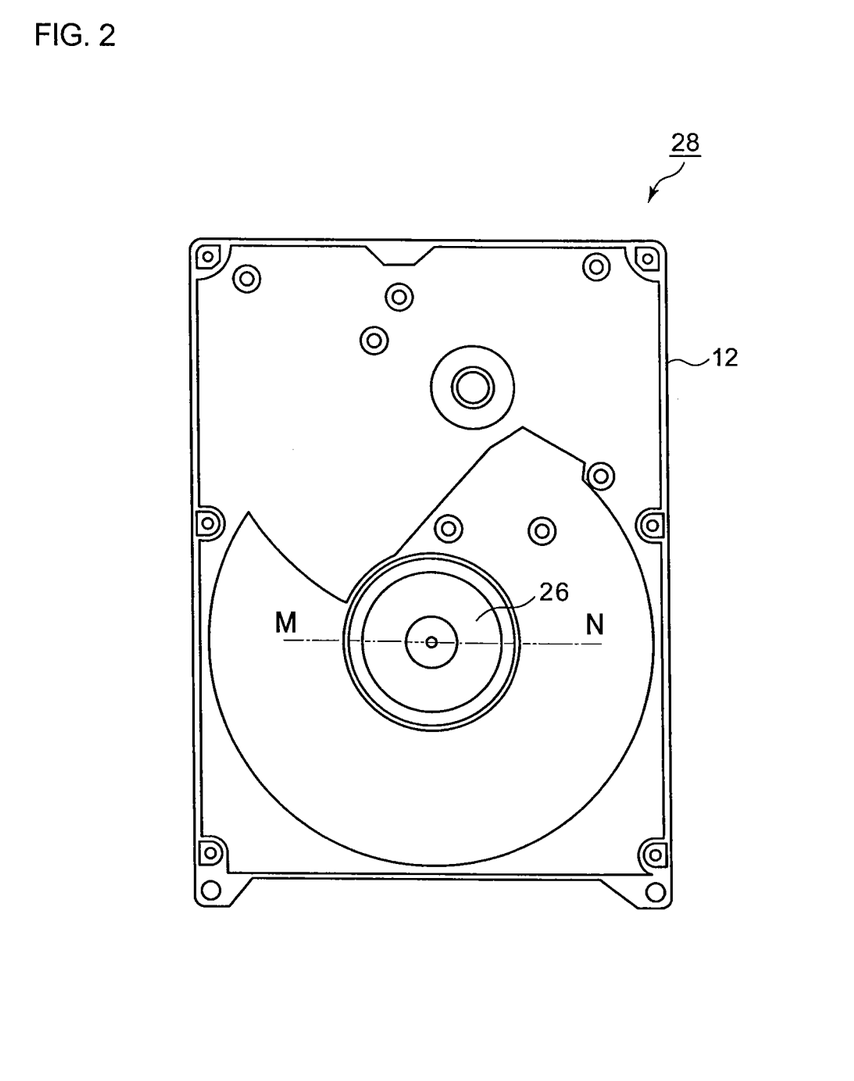
FIG. 2 is a view illustrating a state where a subassembly is made by assembling components to be cleaned in a cleaning process in the manufacturing method illustrated in the present embodiment.

FIG. 2 is a view illustrating a state where a subassembly 28 is made by assembling components to be cleaned in a cleaning process in the manufacturing method illustrated in the present embodiment. In the present embodiment, the subassembly 28 is made by assembling, in an assembly process, the components whose cleanness levels are enhanced by a cleaning process, which will be described later, and thereafter the disk drive device is completed by further mounting the recording disk 20, the magnetic head 24, the swing arm 22, the arm bearing unit 16, the voice coil motor 18 and the cover covering the whole of device, the cleanness levels of which are likewise enhanced.

Figure 3:
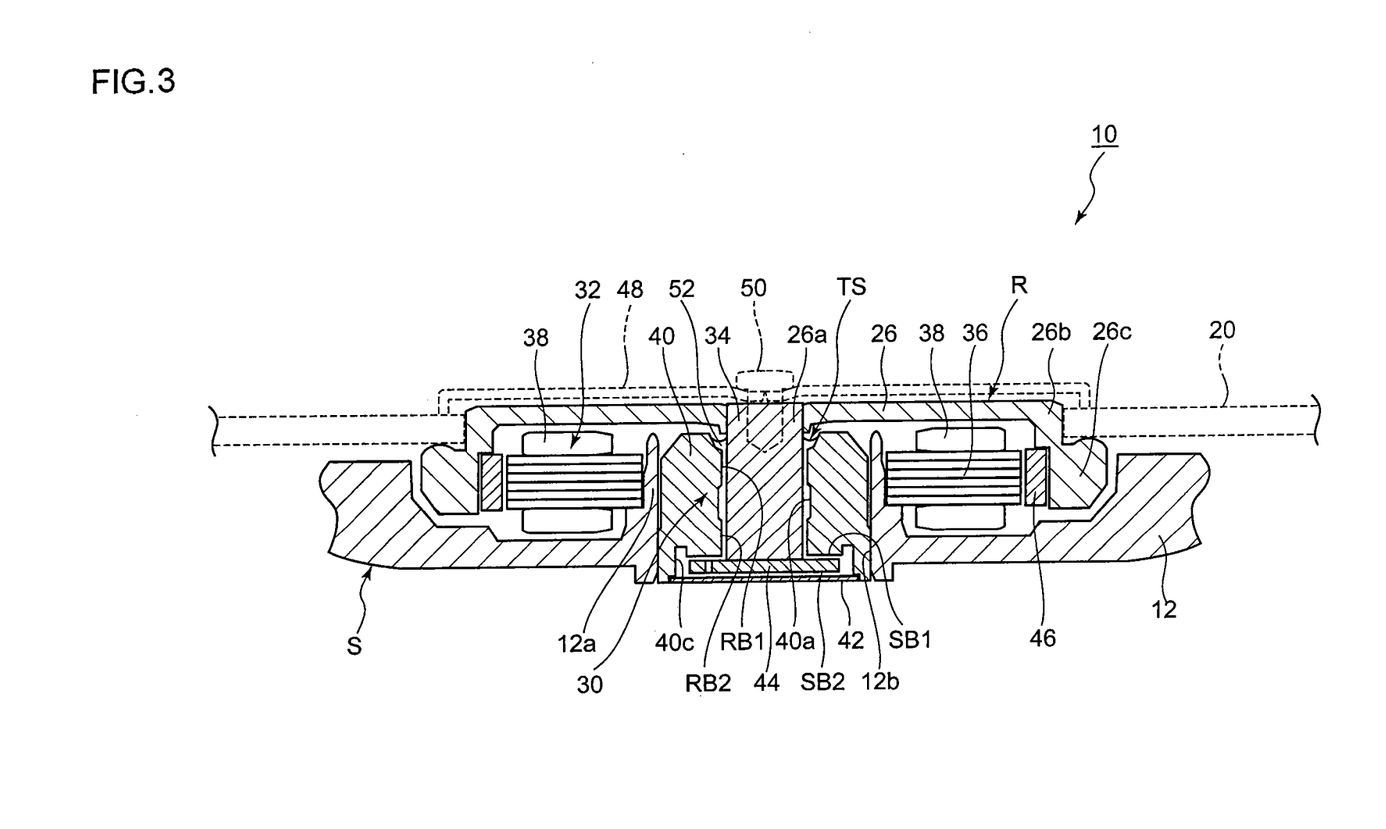
FIG. 3 is a cross-sectional view taken along the cut line illustrated by M-N in FIG. 2.

FIG. 3 is a cross-sectional view, taken along the cut line illustrated by M-N in FIG. 2, illustrating part of the disk drive device 10. As illustrated in FIG. 3, the disk drive device 10 according to the present embodiment is composed of: a fixed body portion S; a rotating body portion R; a bearing unit 30 including a radial fluid dynamic bearing unit composed of radial dynamic pressure grooves RB1 and RB2 and a lubricant agent, and a thrust fluid dynamic bearing unit composed of thrust dynamic pressure grooves SB1 and SB2 and the lubricant agent; and a drive unit 32 rotationally driving the rotating body portion R relative to the fixed body portion S via these fluid dynamic bearing units. FIG. 3 illustrates, as an example, the structure of a so-called shaft-rotation-type disk drive device in which the hub member 26 supporting the recording disk 20 and a shaft 34 rotate integrally. Some components of which the disk drive device 10 is composed are included in a plurality of groups functionally divided into the fixed body portion S, the bearing unit 30, the rotating body portion R and the drive unit 32. For example, the shaft 34 is included in the bearing unit 30 as well as in the rotating body portion R.

The fixed body portion S is configured to include a base member 12, a stator core 36, a coil 38, a sleeve 40, and a counter plate 42. The stator core 36 is fixed to the outer wall surface of a cylinder portion 12a formed on the base member 12. The sleeve 40 is a cylindrical part and formed of a metal material or a conductive resin material. The sleeve 40 is fixed to a housing hole 12b formed by the inner wall surface of the cylinder portion 12a on the base member 12, with, for example, an adhesives, etc. The disk-shaped counter plate 42 is fixed to one end of the sleeve 40, thereby sealing the inside of the base member 12 in which the recording disk 20, etc., is housed.

The base member 12 can be formed by performing, for example, a cutting process on a base material produced with an aluminum die cast, a press process on an aluminum plate, or a press process on a steel plate followed by nickel plating.

The stator core 36 is formed by performing insulation coating made by electro-deposition coating and powder coating, etc., on the surface thereof after a plurality of magnetic plates such as ferrosilicon plates are laminated. The stator core 36 is a ring-shaped member having a plurality of salient poles (not illustrated) protruding outwards in the radial direction, around each of which the coil 38 is wound. When the disk drive device 10 is, for example, three-phase driven, the number of the salient poles are designed to be nine. The wiring terminal of the coil 38 is soldered on an FPC (Flexible Printed Circuits) (not illustrated) arranged on the bottom surface of the base member 12.

The rotating body portion R is configured to include the hub member 26, the shaft 34, a flange 44 and a magnet 46. The hub member 26 is an approximately cup-shaped member, and has an outer circumferential cylinder portion 26b concentric with a central hole 26a and an outward extension portion 26c extending outwards at the lower end of the outer circumferential cylinder portion 26b. The ring-shaped magnet 46 is fixed to the inner wall surface of the outward extension portion 26c. The hub member 26 can be formed by die-molding or machining a metal such as stainless, aluminum and iron, or a conductive resin. The magnet 46 is formed of, for example, an Nd—Fe—B (Neodymium-Ferrum-Boron) material, and on the surface thereof an anti-corrosion treatment is performed by electro-deposition coating or spray coating, etc. In the present embodiment, the inner circumference of the magnet 46 is magnetized with, for example, twelve poles.

One end of the shaft 34 is fixed to the central hole 26a formed in the hub member 26, and to the other end thereof is fixed the disk-shaped flange 44. The shaft 34 can be formed of a metal having a conductivity such as, for example, stainless. The flange 44 can be formed of a metal material or a conductive resin material. A flange-housing space 40c housing the flange 44 is formed at one end of the sleeve 40. Accordingly, the sleeve 40 supports the shaft 34 to which the flange 44 is fixed while allowing for the relative rotation between the sleeve 40 and the shaft 34 in the space surrounded by a cylinder inner wall surface 40a and the flange-housing space 40c.

The shaft 34 to which the flange 44 of the rotating body portion R is fixed is inserted along the cylinder inner wall surface 40a of the sleeve 40 of the fixed body portion S. As a result, the rotating body portion R is rotatably supported by the fixed body portion S via the radial fluid dynamic bearing unit composed of the radial dynamic pressure grooves RB1 and RB2 and the lubricant agent, and the thrust fluid dynamic bearing unit composed of the thrust dynamic pressure grooves SB1 and SB2 and the lubricant agent. The drive unit 32 is configured to include the stator core 36, the coil 38 and the magnet 46. In this case, the hub member 26 structures a magnetic circuit along with the stator core 36 and the magnet 46. Accordingly, the rotating body portion R is rotationally driven by sequentially powering each coil 38 in accordance with a control from a drive circuit provided externally.

The outer circumferential cylinder portion 26b of the hub member 26 according to the present embodiment is engaged with the central hole of the recording disk 20, and the outward extension portion 26c positions and supports the recording disk 20. A clamper 48 is mounted on the top surface of the recording disk 20, and the clamper 48 is fixed to hub member 26 by a screw 50. Thereby, the recording disk 20 is integrally fixed to the hub member 26, allowing the disk 20 to be rotatable with the hub member 26.

Subsequently, the bearing unit 30 will be described. The bearing unit 30 is configured to include the shaft 34, the flange 44, the sleeve 40, and the counter plate 42. The cylinder inner wall surface 40a of the sleeve 40 and the outer circumferential surface of the shaft 34, which faces the cylinder inner wall surface 40a, form a radial space. On at least either the cylinder inner wall surface 40a of the sleeve 40 or the outer circumferential surface of the shaft 34, the radial dynamic pressure grooves RB1 and RB2 are formed, generating a dynamic pressure for support in the radial direction. The radial dynamic pressure groove RB1 is formed on the side remote from the hub member 26, whereas the radial dynamic pressure groove RB2 is formed on the side close to the hub member 26 than the radial dynamic pressure groove RB1. The radial dynamic pressure grooves RB1 and RB2 are, for example, herringborn-shaped or spiral-shaped grooves arranged so as to be spaced apart from each other in the axial direction of the shaft 34. The space formed by these radial dynamic pressure grooves RB1 and RB2 is filled with a lubricant agent 52 such as oil. Accordingly, a high pressure segment is generated in the lubricant agent 52 by the rotation of the shaft 34. The shaft 34 is detached from its surrounding wall surface by the pressure, allowing the shaft 34 to be in a rotational state of substantial non-contact in the radial direction.

In the present embodiment, because the hub member 26 is connected to one end of the shaft 34, the shaft 34 receives a lateral pressure having different strengths between the side close to the hub member 26 and the side remote therefrom. Accordingly, in the present embodiment, the width of the radial dynamic pressure groove RB1 in the axial direction of the shaft 34 is narrower than that of the radial dynamic pressure groove RB2 in the same direction. Thereby, a dynamic pressure corresponding to the lateral pressure having different strengths in the axial direction of the shaft 34 is generated in each radial fluid dynamic bearing unit. As stated above, a high support stiffness of the shaft 34 can be realized by generating a high dynamic pressure, and also, an optimal balance contributing to reduction in a rotational loss of the shaft 34 can be obtained by generating a low dynamic pressure.

As stated above, the flange 44 is fixed to the lower end of the shaft 34, rotating integrally with the shaft 34. In addition, the flange-housing space 40c in which the flange 44 is rotatably housed is formed at the central portion of the lower surface of the sleeve 40. One end of the flange-housing space 40c is sealed with the counter plate 42 such that the flange-housing space 40c and a housing space of the shaft 34 continuous from the flange-housing space 40c are maintained to be air tight.

The thrust dynamic pressure groove SB1 is formed on at least either the flange 44 or the surface of the sleeve 40 facing the flange 44 in the axial direction, whereas the thrust dynamic pressure groove SB2 on at least either the flange 44 or the surface of the counter plate 42 facing the flange 44. The grooves SB1 and SB2 form the thrust fluid dynamic bearing unit in cooperation with the lubricant agent 52. The thrust dynamic pressure grooves SB1 and SB2 are formed to be, for example, spiral-shaped or herringborn-shaped to generate a pump-in dynamic pressure. That is, the pump-in dynamic pressure is generated by rotating the flange 44 on the side of the rotating body portion R, relative to the sleeve 40 and the counter plate 42 on the side of the fixed body portion S. As a result, the rotating body portion R, including the flange 44, is in a substantial state of non-contact relative to the fixed body portion S, with a predetermined space between the two portions in the axial direction, the space created by the generated dynamic pressure, allowing the rotating body portion R, including the hub member 26, to be supported in a state of non-contact relative to the fixed body portion S.

In the present embodiment, the lubricant agent 52 filled in the gap between the radial fluid dynamic bearing unit and the thrust fluid dynamic bearing unit is used in common between the two bearing units. A capillary seal portion TS in which the gap between the inner circumference of the sleeve 40 and the outer circumference of the shaft 34 gradually becomes larger toward the outward of the gap, is formed on the open end of the sleeve 40. The space, including the radial dynamic pressure grooves RB1 and RB2 and the thrust dynamic pressure grooves SB1 and SB2, is filled with the lubricant agent 52, which fills up to the middle of the capillary seal portion TS. The capillary seal portion TS prevents the lubricant agent 52 from leaking out from the filling position by capillarity.

Figure 4:
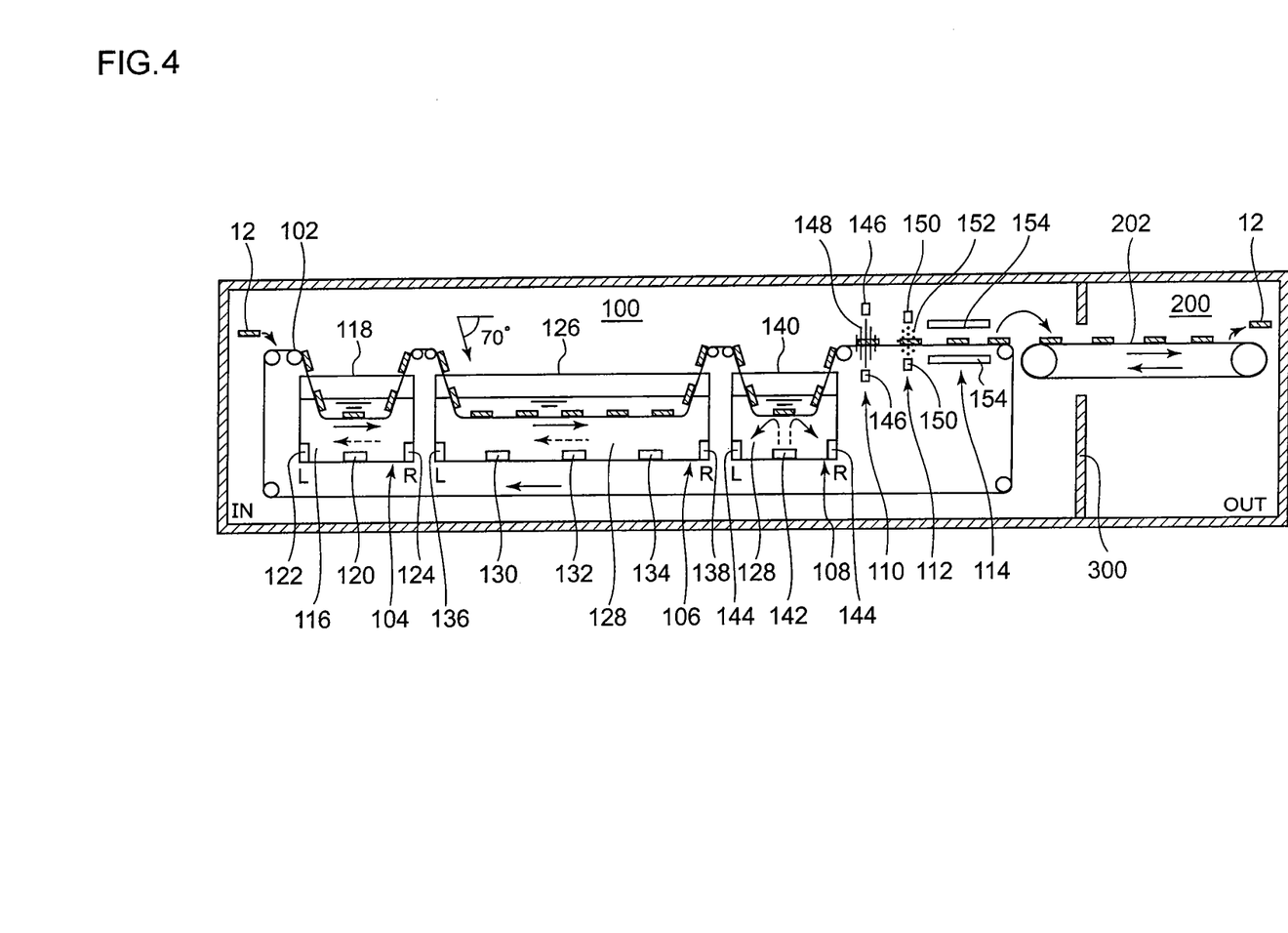
FIG. 4 is a view illustrating the cleaning process and an assembly process in the method of manufacturing a disk drive device according to the present embodiment.

A method of manufacturing the disk drive device 10, configured as stated above, will be described based on FIG. 4. The method of manufacturing the disk drive device 10 according to the present embodiment comprises: a cleaning process 100 in which particles that adhere to a component of the disk drive device 10 are removed; and an assembly process 200 in which components whose cleanness levels are enhanced by the cleaning are assembled into a subassembly. In the cleaning process 100 according to the present embodiment, particles that adhere to at least either the base member 12, the hub member 26, the sleeve 40, or the shaft 34, are removed, as an example. The following description will be made with respect to an example where the base member 12 is cleaned. In FIG. 4, before being cleaned, the base member 12 is inputted into an inlet port (not illustrated) by the IN side and transported to the assembly process 200 through the cleaning process 100. And, an example will be described where the disk drive device 10 whose assembly work is completed is discharged from an outlet port (not illustrated) by the OUT side in assembly process 200.

In FIG. 4, the cleaning process 100 and the assembly process 200 are arranged in a clean room having two blocks separated by a simplified partition 300, each clean room of which is filled with common purified air. A cleanness level of the clean room may be set to, for example, approximately class 1000. The clean room in the assembly process 200, the latter process, is adjusted to a positive pressure, whereas the clean room in the cleaning process 100, the former process, is adjusted to a negative pressure. By adjusting the pressure of the assembly process 200 to a positive pressure, the particles that are detached from a component to be cleaned on the cleaning process 100 side, cannot enter the assembly process 200, even when the particles are floating in air.

In the present embodiment, an example will be described where a target of the cleaning process is, among the components of the disk drive device 10, the base member 12. The base member 12 is transported by a transporting apparatus 102 driven in the cleaning process 100 and a transporting apparatus 202 driven in the assembly process 200. In the case of the present embodiment, the transporting apparatuses 102 and 202 are moved clockwise in a looped manner as indicated by the solid lines in the drawing. For the transporting apparatus 102, known apparatuses can be used, the known apparatuses include: a conveyor belt; an apparatus for moving components such as the base member 12 by providing a hook for hooking the component on a loop-shaped chain; an apparatus for moving the base member 12 by fixing a tray in which the base member 12 is mounted, to a loop-shaped chain or rail; and an apparatus for moving the base member 12 on a rail. Likewise, for the transporting apparatus 202, known transporting apparatuses include a conveyor belt, an apparatus for moving the base member 12 by fixing a tray in which the base member 12 is mounted to a loop-shaped chain or rail, an apparatus for moving the base member 12 on a rail, etc., can be used. FIG. 4 illustrates an example where a conveyor belt is adopted. The conveyor belt is taken into consideration so as not to interfere with the cleaning by reducing a contact area with the component as much as possible by, for example, the belt portion thereof formed into a mesh shape or the transporting surface thereof provided with a plurality of convex portions or holes. Particles can be removed efficiently by creating, in the conveyor belt or the tray, many holes having a diameter larger than a quarter of the wavelength of the ultrasonic wave in the cleaning liquid such that the detergency of the ultrasonic wave is efficiently provided to the base member 12.

In the present embodiment illustrated in FIG. 4, the base member 12 is cleaned so as to have a predetermined cleanness level by removing particles adhered thereto in the cleaning process 100, and thereafter, the shaft 34, the sleeve 40, the hub member 26, etc., whose cleanness levels are enhanced to the predetermined level or a greater level of cleanness, are assembled onto the base member 12 in the assembly process 200. There is a possibility that inorganic particles, originating from various inorganic materials, and hydrocarbon particles, originating from various organic substances, may adhere to the base member 12 in a combined manner. Accordingly, in the cleaning process 100, a removal method suitable for each type of particles is adopted.

The base member 12 is at first inputted onto the transporting apparatus 102 into the inlet port (not illustrated) at the end of the IN side and transported toward the assembly process 200. The cleaning process 100 according to the present embodiment includes an alkali cleaning process 104, a first purified water cleaning process 106, a second purified water cleaning process 108, a spray cleaning process 110, a draining process 112 and a drying process 114.

The alkali cleaning process 104 is the first process for cleaning the base member 12, and is performed in an alkali cleaning tank 118 filled with alkali ion water 116. An ultrasonic generator 120 is arranged on the bottom of the alkali cleaning tank 118. The ultrasonic generator 120 performs an alkali ultrasonic wave cleaning on the base member 12 thus transported by generating, for example, an ultrasonic wave of a frequency of 40 kHz.

As stated above, there is a possibility that inorganic particles, originating from various inorganic materials, and hydrocarbon particles, originating from various organic substances, may adhere to the base member 12 in a combined manner. Because the hydrocarbon particles have a low affinity to purified water, the efficiency of removing the hydrocarbon particles by the cleaning using purified water is low. Although a method of removing the hydrocarbon particles by using a surface acting agent can be considered, any remaining components of the residue of the surface acting agent, if any, may possibly vaporize and contaminate the recording disk. Further, multi-stage rinsing processes are needed to reduce the residue of the surface acting agent, possibly causing the apparatus to be large in size. Accordingly, in the present embodiment, the hydrocarbon particles are at first removed in the alkali cleaning process.

Having many negative ions obtained by, for example, the electrolysis of purified water added with an electrolyte, the alkali ion water 116 reacts well with the hydrocarbon particles, and exerts a good capability for removing the particles by emulsification and dispersion. Further, having a low surface tension, the alkali ion water 116 infiltrates the inside of narrow spaces such as holes formed in the base member 12, allowing particles to be removed effectively.

The operation of an ultrasonic wave can be improved by performing the process of removing dissolved air in the alkali ion water 116 by, for example, reducing an amount of the dissolved air to 5% or less. Regarding this case, when one intends to reduce the amount of the dissolved air to less than 2%, the apparatus for the process is large in size, and therefore it is preferable that the amount thereof is within the range of 2 to 5% in terms of obtaining a low-cost and an efficient alkali ultrasonic wave cleaning. Although a necessary effect of removing particles can be expected with alkali ion water having a pH of 10 or more, water having a pH of 11 to 13 is used in the present embodiment. It is because the present inventors have obtained an experimental result that, with respect to the probability of the occurrence of a TA failure in the disk drive device 10, the necessary level can be secured by performing the alkali ultrasonic wave cleaning using the alkali ion water 116, having a pH of 11 to 13, and having the amount of dissolved air be 2 to 5%, and further by performing the subsequent purified water cleaning.

If many ions remain on the disk drive device 10, the insulation properties of the high impedance portions may be deteriorated. In the present embodiment, because the purified water cleaning is performed following the alkali ultrasonic wave cleaning, the problems due to the remaining ions and the problem of contamination due to vaporization of the remaining element, etc., can be avoided.

In the present embodiment, a pump 122 for pumping the alkali ion water 116 is provided at the end L on the IN side of the alkali cleaning tank 118. The alkali ion water 116 pumped by the pump 122 is discharged from a discharge nozzle 124 provided at the end R on the OUT side of the alkali cleaning tank 118 after the foreign substances floating in the water 116 are captured with a filter (not illustrated). By performing this purification process, a current of water, flowing from the OUT side to the IN side, is generated in the alkali cleaning tank 118, in the opposite direction that the base member 12 is transported. In FIG. 4, the water current flowing in the opposite direction is indicated by dashed lines. Accordingly, the particles, once removed from the base member 12, float away from the vicinity of the base member 12 in the water current that flows in the opposite direction and are captured with the filter. As a result, the possibility of reattachment of the particles during the alkali ultrasonic wave cleaning can be reduced. Further, an efficient process of removing the particles can be performed with the use of a cleaning liquid that always has a high cleanness level due to the purification process.

The base member 12 treated in the alkali cleaning process 104 is transported to a first purified water cleaning process 106. Not only the base member 12 but also other components of the disk drive device 10 have complicated shapes in which narrowly spaced portions, such as holes, and broad, flat portions are combined. In the case of the ultrasonic wave cleaning, an ultrasonic wave of a relatively low frequency has a long wavelength and a large cavitation effect, and hence is suitable for removing large mass particles or firmly adhered particles. On the other hand, an ultra sonic wave of a relatively high frequency has a short wavelength and is hence suitable for removing particles in a narrow space. Accordingly, in the present embodiment, the purified water ultrasonic wave cleaning is performed by using ultrasonic waves of at least two or more of frequencies. Alternatively, a purified water cleaning using an ultrasonic wave of one frequency in purified water may be performed following the alkali cleaning.

In the first purified water cleaning process 106, a first purified water cleaning tank 126 is filled with purified water 128. An ultrasonic generator 130 generating an ultrasonic wave of a frequency of 40 kHz, an ultrasonic generator 132 generating an ultrasonic wave of a frequency of 68 kHz, and an ultrasonic generator 134 generating an ultrasonic wave of a frequency of 132 kHz are arranged on the bottom of the first purified water cleaning tank 126. Each of the ultrasonic generators 130,132, and 134 performs the purified water ultrasonic wave cleaning on the base member 12 thus transported. As a result, the large mass particles adhered to the base member 12 and the small particles that are adhered in to a narrow space can be efficiently removed. By irradiating the base member 12 with ultrasonic waves of different frequencies in the same first purified water cleaning tank 126 at a time in order to perform an ultrasonic wave cleaning on the member 12, a vibration that is a beat of these ultrasonic waves is generated. As a result, cleaning non-uniformity can be reduced and the capability of removing the particles can be improved. Further, the efficiency of space can be improved and the apparatus cost can be reduced in comparison with the case where the cleaning tanks are separated for each frequency.

As stated above, the present inventors have obtained an experimental result that, with respect to the probability of the occurrence of a TA failure in the disk drive device 10, by performing multi-stage purified water ultrasonic wave cleaning in which an ultrasonic wave of a higher frequency is used toward the end of the cleaning, such as a frequency of 40 kHz at the start of the cleaning following the alkali ultrasonic wave cleaning, subsequently an intermediate frequency of 68 kHz, and finally a further higher frequency of 132 kHz at the end of the cleaning, the requisite level can be secured. The inventors also have obtained an experimental result that, in the case of using the ultrasonic waves in multi-stages, various particles having different sizes and masses can be efficiently removed by setting the frequency of the ultrasonic wave used in the subsequent stage to a value obtained by multiplying the frequency thereof used in the preceding stage by approximately 1.5 to 2. If an ultrasonic wave of a frequency of 40 kHz or less is used, the cavitation effect becomes too strong, causing the aluminum of which the base member 12 is formed to be possibly corroded or eroded; therefore, it is preferable that such a frequency is not used.

Also in the first purified water cleaning tank 126, a pump 136 for pumping purified water 128 is provided at the end L on the IN side of the tank 126. The purified water 128 pumped by the pump 136 is discharged from a discharge nozzle 138 provided at the end R on the OUT side of the first purified water cleaning tank 126 after the particles floating in the water 128 are captured with a filter (not illustrated). With the purification process, a current of water indicated by the dashed arrow, flowing from the OUT side to the IN side, is generated in the first purified water cleaning tank 126 in the opposite direction that the base member 12 is transported. Accordingly, the particles, once removed from the base member 12, float away from the vicinity of the base member 12 by the water current and are captured with the filter. As a result, the possibility of reattachment of the particles during the purified water ultrasonic wave cleaning can be reduced.

The base member 12 treated in the first purified water cleaning process 106 is transported to a second purified water cleaning process 108. The second purified water cleaning tank 140 is also filled with the purified water 128. A jet cleaning nozzle 142, which generates a jet flow such that a current of water generated by the jet flow cleans the base member 12 to remove particles remaining thereon, is arranged on the bottom of the second purified water cleaning tank 140. By continuously providing an acting force to the surface of the base member 12 with such a strong water current generated, the particles, such as the particles not removed by the ultrasonic wave cleaning in the first purified water cleaning process 106 and that have reattached to the base member 12 while being transported in the first purified water cleaning tank 126, can be redetached therefrom in the second purified water cleaning tank 140. Pumps 144 for pumping the purified water 128 are provided at the end L on the IN side and at the end R on the OUT side of the second purified water cleaning tank 140. The purified water 128 pumped by these pumps 144 is discharged from a jet cleaning nozzle 142 after foreign substances such as the particles floating in the water 128 are captured with a filter (not illustrated). With the purification process, water currents indicated by the dashed arrows, flowing from the center to the IN side and OUT side, are generated in the second purified water cleaning tank 140. As a result, the particle detached from the base member 12 by the jet flow float away from the direction of the base member 12 by floating in the water currents generated by the purification process. Accordingly, the possibility of reattachment of the particles, once removed from the base member 12, can be reduced. Further, the jet flow from the jet cleaning nozzle 142 becomes the clean purified water 128 from which the particles are removed, allowing the cleanness efficiency to be improved.

When performing the ultrasonic wave cleaning in the alkali cleaning process 104, the first purified water cleaning process 106 or the second purified water cleaning process 108, etc., if the base member 12 is transported, in the cleaning liquid, in a state where the surface thereof having a large area is kept horizontal, there is a possibility that an air bubble caused by the cavitation may be sucked in and held in the irregular sections of the base member 12. Because an ultrasonic wave does not act on the portion where the air bubble is held, the particles on the portion are difficult to be removed. Accordingly, in the present embodiment, a surface having a small area of the base member 12 is to be positioned ahead and dipped into the cleaning liquid, thereby allowing an air bubble thus held to be released from the base member 12. For example, in FIG. 4, the base member 12 is dipped into the cleaning liquid at a slant in which the surface having a small area of the member 12, i.e., the edge surface thereof, is positioned ahead. The angle can be, for example, 70°. As a result, the occurrence of a phenomenon where an air bubble is sucked in and held in the base member 12 is reduced, thereby allowing the ultrasonic wave cleaning to be successfully performed during the moving of the cleaning liquid.

In the present embodiment, the cleaning tanks are structured into a multi-stage structure provided with the alkali cleaning tank 118, the first purified water cleaning tank 126 and the second purified water cleaning tank 140, and the base member 12 is at a slant when dipped into and discharged from each cleaning tank. As a result, an air bubble sucked in and held in the base member 12 can be removed efficiently. By setting the angle at which a component to be cleaned such as the base member 12 is dipped into and discharged from the tank, to an angle within the range of 20° to 90°, it becomes more difficult for air bubbles to be sucked in and becomes easier for air bubbles sucked in to be released; however, it is more preferable that the angle is, for example, within the range of 45° to 80° in order to obtain a stable effect. Further, as stated above, because the water current moving in the opposite direction in which the base member 12 is transported, is formed in the cleaning liquid in each cleaning tank, the effect of accelerating the release and removal of the air bubble sucked in and held, can also be obtained by this water current. As another embodiment, the base member 12 transported in the cleaning liquid may be rotated or shaken. By being transported while being rotated, the whole base member 12 can be uniformly subjected to the ultrasonic wave cleaning, and the release of the air bubble sucked in and held can be performed efficiently. The same effect can be obtained when shaking the base member 12.

In the present embodiment, an ultrasonic generator generating ultrasonic waves is arranged on the bottom of each cleaning tank. As a result of repeated experiments, the present inventors have obtained a result that, comparing the case where the base member 12 is transported through the area close to the bottom of the liquid with the case where the base member 12 is transported through the area close to the surface thereof, the effect of removing the particles is lower in the former case. Therefore, in the present embodiment, the efficient removal of the particles can be realized by transporting the base member 12 through the area closer to the surface of the liquid than half the depth thereof in the cleaning tank. Specifically, when the depth of the liquid from the surface to the bottom in each cleaning tank is 24 cm, the base member 12 is transported through the area closer to the surface of the liquid than the depth of 12 cm, and thereby an efficient removal of the particles has been found. Further, by transporting the base member 12 through the area closer to the surface thereof than the depth of 8 cm, a result has been obtained that the effect of removing the particles is greater improved. Moreover, by transporting the base member 12 through the area closer to the surface thereof than the depth of 6 cm, the effect of removing the particles has been far more improved. Even when an ultrasonic generator generating ultrasonic waves is arranged, for example, on the side surface of the cleaning tank other than the bottom thereof, the same effect can be obtained by transporting the base member 12 through the same area.

The present inventors have obtained an experimental result that, when the interval between the base members 12 transported in succession is narrow in the purified water cleaning process, an ultrasonic wave does not act sufficiently on the portion facing the narrow space, and the particles once removed are difficult to be discharged from the vicinity of the base member 12. From repeated experiments, the inventors have found that the aforementioned problem can be avoided by setting the interval between the base members 12 to a value larger than a quarter of the wavelength of the ultrasonic wave thus used in the water in the purified water cleaning process. For example, when using an ultrasonic wave of a frequency of 68 kHz during the condition in which the acoustic velocity in water is 1500 msec, the wavelength of the ultrasonic wave is approximately 22 mm, and hence the interval of the base members 12 has been set to 5.5 mm or more. As a result, the sufficient removal of the particles can be found even on the portions facing the narrow space between respective base members 12, and the further reattachment of the particles has been suppressed. The inventors also have obtained an experimental result that, by setting the interval between the base members 12 to a value larger than half the wavelength of the ultrasonic wave in water, a more efficient ultrasonic wave cleaning can be realized, and the particles once removed can be easily discharged from the vicinity of the base member 12.

In the process drawing in FIG. 4, the base member 12 treated in the second purified water cleaning tank 140 is transported to the spray cleaning process 110. Of the metal particles adhered to the base member 12, the particles having a relatively large size has a large mass, and hence such particles are sometimes not removed only by the ultrasonic wave cleaning and the jet cleaning performed in the liquid. Accordingly, the spray cleaning process 110 is arranged in the clean room continuous from the alkali cleaning process 104, the first purified water cleaning process 106 and the second purified water cleaning process 108. In the spray cleaning process 110, a blow cleaning is performed by blowing a mixture 148 of purified water and air from spray nozzles 146 arranged around the base member 12. Mixing purified water with air to make fine particles of purified water and spraying the mixture at a high velocity can provide high kinetic energy. In this case, because the kinetic energy of a purified water particle is proportional to the product obtained by multiplying the mass of the purified water particle by the square of the velocity, the kinetic energy can be adjusted by controlling the diameter of the purified water particle and the blowing velocity, i.e., the degree of compaction of air. In the present embodiment, the inventors have obtained an experimental result that, by performing the spray cleaning process 110 in which the diameter of the purified water particle is within the range of 20 to 80 µm and the blowing velocity is within the range of 20 to 80 m/s, following the alkali cleaning process 104, the first purified water cleaning process 106 and the second purified water cleaning process 108, a required level with respect to the probability of the occurrence of a TA failure in the disk drive device 10 can be secured. When forming a suction port in the direction in which the mixture 148 jetted from the spray nozzle 146 is expected to spatter after colliding with the base member 12, the particle detached and removed from the member 12 by the mixture 148 can be recovered along with the mixture 148. As a result, the floating of the particles and reattachment thereof can be both avoided. The recovered mixture 148 is made pass through a filter (not illustrated) such that the purified water thereof is cleaned, and is sent to the spray nozzle 146 again.

As stated above, by performing the spray cleaning in the clean room continuous from the previous process without storing the components in ordinary air after being subjected to the purified water cleaning, the adhesion of particles floating in the air to the base member 12 can be easily avoided. As a result, the adhesion of the particle between the processes can be greatly improved. Likewise, the adhesion of the particles floating in air to the base member 12 can be easily avoided by performing the subsequent process in a continuous clean room, without storing the components in ordinary air between the alkali cleaning process 104 and the first purified water cleaning process 106, the first purified water cleaning process 106 and the second purified water cleaning process 108, the spray cleaning process 110 and the draining process 112, and the draining process 112, and the drying process 114, etc., the last two described later.

In most of the conventional cleaning processes using liquids, components such as the base member are dipped into a cleaning tank in a state where units of several hundreds of the components are stacked together in a basket, etc., so that an ultrasonic wave acts on the components that have been left to rest in the cleaning tank for a certain time. In this case, the rate of removal of the particles is extremely decreased in the portions where the components are overlapped together. The same is true with the components placed in the central area of the basket. Further, because areas in which an ultrasonic wave acts strongly and areas in which an ultrasonic wave acts weakly are generated in the cleaning tank, the rate of removal of the particles is decreased with a component dipped into an area in which an ultrasonic wave acts weakly, causing a large non-uniformity of removing the particles to be created due to the difference between the ultrasonic wave actions for every component. Accordingly, the total cleaning time is required to be long, causing the working efficiency to be deteriorated. Further, the particles once removed continue to float near the components due to the congestion of many components, sometimes causing the reattachment of the particles onto the components.

Contrary to this, in the cleaning method according to the present embodiment, the base member 12 is arranged on the transporting apparatus 102 so as to create an interval with another base member 12 in the purified water process, as stated above. And, the ultrasonic waves act on the member 12 while transporting the member 12 in a fixed direction. And, because each base member 12 passes through the same ultrasonic wave area, a difference between the ultrasonic wave actions for each base member 12 hardly exists, allowing the non-uniformity of removing the particles to be suppressed. Also, because the base member 12 mounted on the transporting apparatus 102 is transported at a fixed speed, particles once removed easily float away from the vicinity of the base member 12, allowing the possibility of reattachment to be reduced. Specifically, the transporting apparatus 102 is configured such that the base member 12 is transported at a speed of, for example, 3 cm/s. With respect to the speed, the inventors have obtained an experimental result that, a speed of 0.5 cm/s or less is not preferred because it makes the working time too long; and a speed of 20 cm/s or more is not preferred because it makes the working time too short, likely causing the non-uniformity of removing the particles. Accordingly, the inventors have found the result that the particles can be successfully removed by setting the moving speed of the transporting apparatus 102 to a value within the range of 0.5 cm/s to 20 cm/s.

The base member 12 treated in the spray cleaning process 110 is transported to the draining process 112. In the draining process 112, water is drained by blowing clean air 152 against the base member 12 from an air nozzle 150. A cleanness level of the clean air in this case is preferably class 100 or less. The base member 12 may also be rotated or shaken in the draining process 112, allowing further efficient draining to be performed.

The base member 12 treated in the draining process 112 is transported to the drying process 114. In the drying process 114, the whole base member 12 is dried by hot air and a far-infrared heater 154. The base member 12 may also be rotated or shaken in the drying process 114, allowing further efficient drying to be performed.

The base member 12 treated in the drying process 114 is transported to the assembly process 200. In the present embodiment, the starting end of the transporting apparatus 202 in the assembly process 200 is installed so as to enter the cleaning process 100 side such that the base member 12 is delivered from the transporting apparatus 102 to the transporting apparatus 202 by a load changing apparatus (not illustrated) arranged between the two transporting apparatuses 102 and 202.

In the assembly process 200, with the base member 12 whose cleanness level is enhanced to a predetermined value by the cleaning process, are assembled the sleeve 40, the shaft 34 and the hub member 26, the cleanness levels of which are also maintained at a predetermined value or a greater value. As stated above, because the cleaning process 100 and the assembly process 200 are arranged in the continuous clean room, the reattachment of the particles to the disk drive device 10 under assembly can be greatly reduced. Thereafter, the recording disk 20 whose cleanness level is enhanced is further mounted on the hub member 26, and the magnetic head 24, the swing arm 22, the arm bearing unit 16, the voice coil motor 18, the control circuit, and other necessary components are mounted, completing the assembly of the disk drive device 10. The assembly work may be performed in the assembly process 200 or in another clean room having a predetermined cleanness level.

In the aforementioned embodiments, an example in which the base member 12 is cleaned in the cleaning process 100 has been described. However, the same cleaning can also be performed on the sleeve 40, the shaft 34 and the hub member 26, etc., that are components of the disk drive device 10, in the cleaning process 100, allowing for the same effect to be obtained. Further, in the aforementioned embodiments, an example in which the base member 12 is transported as a single body through the cleaning process. However, the base member 12, the sleeve 40, the shaft 34, the hub member 26 and the like of which the disk drive device 10 is composed, may be mounted, as one group, on a common conveyance palette to be transported, so that these components are subjected to the cleaning and drying processes. In this case, it is preferable that the components included in the one group are arranged on the common conveyance palette such that the interval between two adjoining components is maintained at the aforementioned level at which the ultrasonic wave cleaning is successfully performed, as stated above. By transporting and cleaning one set of components on the common conveyance palette, the cleanness of the components of the disk drive device 10 are the same levels as each other, contributing to quality stability. Further, as is sometimes the case, each component exhibits a biased feature according to the manufacturing lot or processing time, even if the processing accuracy is within the acceptable range. In such a case, the components compatible with each other, combined with each other in advance, can be mounted on the common conveyance palette. As a result, the assembly work can be smoothly performed by combining the components that are compatible with each in the assembly process 200, contributing to quality stability.

As stated above, by performing the cleaning process 100 in which each cleaning process and the assembly process 200 are conducted in continuous clean rooms, the number of particles that are adhered to the disk drive device 10 can be greatly reduced, and the variation in the numbers of adhered particles can be reduced. As a result, the probability of the occurrence of a TA failure in the disk drive device 10 can be small even when the flying height of the magnetic head 24 is small, allowing an easy accurate reading of a reproduced signal in the assembled disk drive device 10.

Figure 5:
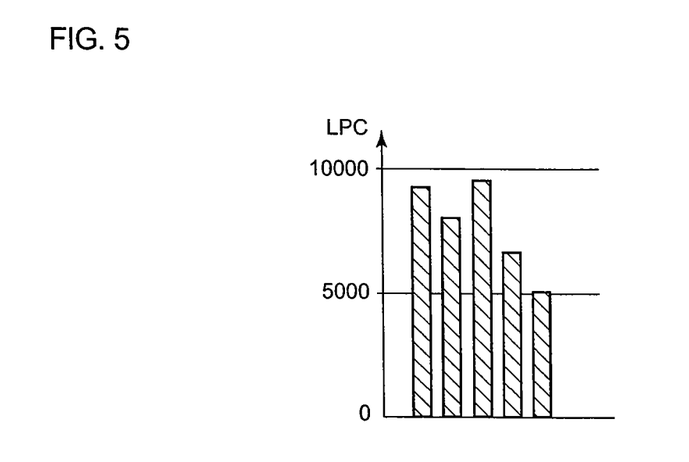
FIG. 5 is a graph illustrating the LPC on a disk drive device manufactured by a conventional manufacturing method.
Figure 6:
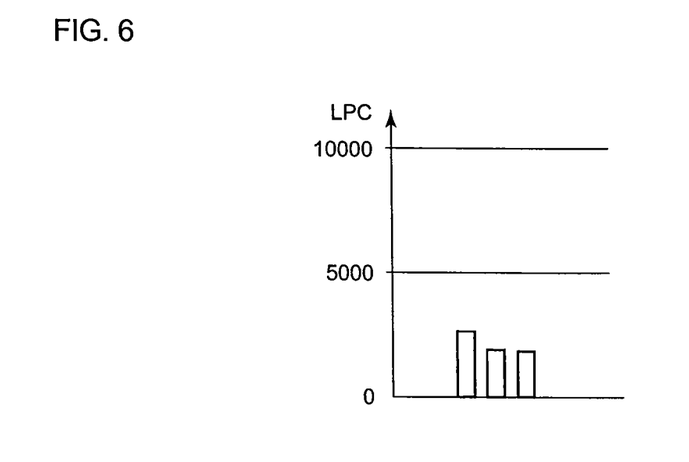
FIG. 6 is a graph illustrating the LPC on the disk drive device manufactured by the manufacturing method according to the present embodiment.

FIG. 5 represents the LPC indicating the number of the particles having a size greater than or equal to 0.5 μm per 1 cm2 on a disk drive device in which a sleeve and a hub member are mounted on a base member manufactured by a conventional batch-type manufacturing method. The cleanness levels LPCs on five disk drive devices to be tested vary in the range of 5000 to 10000 particles, and it can be understood that it is difficult to maintain the LPC to be stable at 8000 particles or less. Contrary to this, FIG. 6 represents the LPCs on the disk drive device 10 in which the sleeve 40, the shaft 34 and the hub member 26 are mounted on the base member 12 manufactured by the manufacturing method according to the present embodiment illustrated in FIG. 4. In this case, the following result has been obtained: the LPCs indicating the numbers of the particles having a size greater than or equal to 0.5 μm per 1 cm2 on three disk drive devices to be tested are reduced to approximately 2000 particles or less; and a variation in the LPCs is small.

As stated above, in the disk drive device having the LPC of 5000 to 10000 particles obtained by a conventional manufacturing method, there is a large variation in the numbers of the particles for every device. Accordingly, the number of particles needs to be checked in an inspection process of the disk drive device, so that a device having a large number of particles will be prevented from being shipped as is. In this case, a particular process of removing the particles, for example, wiping the particles off, etc., is added, and hence the efforts for manufacturing the device have been increased. Further, in this case, a rotational speed of the recording disk is sometimes lowered in order to reduce the possibility of the occurrence of a TA failure, causing the reading of data to be slow. Contrary to this, the LPC can be reduced to 2000 particles or less on the disk drive device 10 provided with the sleeve 40, the shaft 34 and the hub member 26 on the base member 12, by using the manufacturing method according to the present embodiment. That is, the variation in the number of particles for every device can be small. As a result, a particular process of removing the particles is not necessary, allowing the efforts of manufacturing the device to be reduced. Further, the rotational speed of the recording disk does not need to be lessened, allowing a high-performance disk drive device 10 to be provided.

In the aforementioned method of manufacturing the disk drive device 10, the LPC on the disk drive device 10 can be reduced to 1500 particles or less by extending the cleaning time with the speed at which the component to be cleaned such as the base member 12 is transported being adjusted. With the same way, the LPC on the disk drive device 10 can be reduced to 1000 particles or less. Such control of the LPC is preferably performed such that, comparing the effort and work efficiency necessary for the control thereof with those which are necessary for removing the particles, the efficiency is improved.

In the aforementioned embodiment, the descriptions have been made, taking a shaft-rotation-type disk drive device 10 as an example of the disk drive device 10. However, the manufacturing method according to the embodiment can be applied to a disk drive device having other structures such as a shaft-fixed-type disk drive device, and in that case, the same effect as the present embodiment can be obtained.

The present invention shall not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A method of manufacturing a disk drive device including a base member, a hub on which a disk is mounted, a shaft, and a sleeve housing the shaft as components, the shaft and the sleeve being configured to be relatively rotatable so as to form a bearing unit, and the hub being supported on the base member via the bearing unit, the method comprising:
   preparing a cleaning tank filled with purified water, radiating an ultrasonic wave of a first frequency onto a first position in the cleaning tank;
   immersing at least one component of said components at the first position;
   transporting said at least one component at the first position to a second position;
   radiating an ultrasonic wave of a second frequency different from the first frequency onto the second position removed from the first position by a predetermined interval in the cleaning tank;
   taking said at least one component from the second position to outside of the cleaning tank;
   drying said at least one component; and
   assembling the disk drive device including said at least one component in a clean area that has been transported in a continuous process from the cleaning tank and having a predetermined level of cleanliness or higher level of cleanliness.

2. The method of manufacturing a disk drive device according to claim 1, wherein, the second frequency of the ultrasonic wave radiated in the cleaning tank filled with purified water is higher than the first frequency of the ultrasonic wave.

3. The method of manufacturing a disk drive device according to claim 2, wherein the second frequency is 1.5 to 2 times the first frequency.

4. The method of manufacturing a disk drive device according to claim 1, wherein an alkali cleaning is performed in which said at least one component is subjected to an ultrasonic wave in alkali ion water while being transported, prior to immersing said at least one component in the cleaning tank filled with purified water.

5. The method of manufacturing a disk drive device according to claim 4, wherein the alkali ion water used in the alkali cleaning has a pH of 11 to 13 and an amount of dissolved air of 2 to 5%.

6. The method of manufacturing a disk drive device according to claim 1, wherein, in the cleaning tank filled with purified water, said at least one component is cleaned while being transported in purified water flowing in the opposite direction in which said at least one component to be cleaned is transported.

7. The method of manufacturing a disk drive device according to claim 1, wherein, in the cleaning tank filled with purified water, said components are cleaned while being transported in succession in purified water with a predetermined other interval.

8. The method of manufacturing a disk drive device according to claim 7, wherein the predetermined other interval is larger than a quarter of a wavelength of the ultrasonic wave.

9. The method of manufacturing a disk drive device according to claim 1, wherein the clean area has a positive pressure relative to an area in which the cleaning tank is provided.

10. The method of manufacturing a disk drive device according to claim 1, further comprising hitting said at least one component by a jet flow of purified water.

11. The method of manufacturing a disk drive device according to claim 1, wherein, in the cleaning tank filled with purified water, said at least one component is transported while being provided with either a rotational movement or vibrational movement, or both, at least in purified water.

* * * * *